(12) United States Patent
Koo et al.

(10) Patent No.: US 7,706,439 B2
(45) Date of Patent: Apr. 27, 2010

(54) SIGNAL TRANSMITTING AND RECEIVING METHOD OVER WIRELESS NETWORK AND A READER

(75) Inventors: Ji-hun Koo, Yongin (KR); Woo-shik Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1070 days.

(21) Appl. No.: 11/386,759

(22) Filed: Mar. 23, 2006

(65) Prior Publication Data

US 2007/0098062 A1 May 3, 2007

(30) Foreign Application Priority Data

Oct. 31, 2005 (KR) ...................... 10-2005-0103254

(51) Int. Cl.
*H03K 7/08* (2006.01)
(52) U.S. Cl. .................................................... 375/238
(58) Field of Classification Search .................. 375/238; 340/10.2, 10.4, 870.02, 870.03, 870.15, 870.24, 340/825.63; 370/212
See application file for complete search history.

(56) References Cited

U.S. PATENT DOCUMENTS

| | | | | |
|---|---|---|---|---|
| 5,742,237 | A | * | 4/1998 | Bledsoe .................. 340/825.49 |
| 2007/0274242 | A1 | * | 11/2007 | Lamacraft et al. ........... 370/310 |
| 2007/0279194 | A1 | * | 12/2007 | Carrender et al. .......... 340/10.4 |
| 2008/0018200 | A1 | * | 1/2008 | Vogeley et al. .............. 310/317 |

* cited by examiner

*Primary Examiner*—Don N Vo
(74) *Attorney, Agent, or Firm*—Sughrue Mion, PLLC

(57) ABSTRACT

A signal transmitting and receiving method in a wireless network use a reader creates a pulse width list relating to pulse widths of transmission signals; transmits signals in sequence according to the created pulse width list; and receives a reply signal with respect to the transmitted signals. The method includes creating a pulse width list relating to pulse widths of the transmitted signals; transmitting signals in sequence according to the created pulse width list; and creating an available pulse width list including a corresponding pulse width in response to receiving a reply signal from the transmitted signals; and transmitting signals in sequence according to the created available pulse width list.

32 Claims, 5 Drawing Sheets

SIGNAL TRANSMITTING AND RECEIVING METHOD OVER WIRELESS NETWORK AND A READER

CROSS-REFERENCE TO RELATED APPLICATIONS

This application claims the benefit under 35 U.S.C. § 119 (a) from Korean Patent Application No. 2005-103254 filed on Oct. 31, 2005 in the Korean Intellectual Property Office, the entire disclosure of which is incorporated herein by reference.

BACKGROUND OF THE INVENTION

1. Field of the Invention

Methods and apparatuses consistent with the present invention relate to a signal transmission and reception over a wireless network and a reader. More particularly, the present invention relates to a method of transmitting and receiving a signal over a wireless network and a reader using a pulse width list of a transmission (Tx) signal to improve communication efficiency.

2. Description of the Related Art

FIG. 1 depicts a simplified construction of a wireless network system according to the related art. The wireless network system of the related art includes a reader 10 and at least one sensing means 20. The sensing means 20 may be a tag or a sensor.

The reader 10 transmits a signal to the sensing means 20. In response to the transmitted signal, the sensing means 20 transmit a signal containing information collected from their environments to the reader 10. However, smooth communications between the reader and the sensing means 20 may be interrupted by the following factors:

A tag collision when the reader 10 receives signals from a plurality of sensing means 20 at the same time, a reader collision when a plurality of readers 10 generates or receives signals at the same time, a sensitivity problem of the reader 10, and an unrecognized signal command received from the reader 10 due to channel conditions of the sensing means 20.

The techniques described here analyze and resolve the degradation of the communication performance when the sensing means 20 cannot recognize the signal command received from the reader 10.

In the related art, when communicating without a channel filter, the reader 10 transmits a transmission (Tx) signal (signal command) to the sensing means 20 using amplitude shift keying (ASK) modulation. The sensing means 20 receives the Tx signal from the reader 10 using envelope detection.

FIG. 2 is a graph showing a spectral mask in a wireless network environment where a plurality of readers is present. To minimize the interference between the readers, the frequency channel and the spectral mask of the channel, as shown in FIG. 2, should be satisfied. Meanwhile, 27 channels are allocated within the domestic frequency range 908.5 MHz~914 MHz and the channel width for each channel is 200 KHz.

However, if a link frequency is 40 KHz, a transmitter for the reader 10 requires a channel filter to satisfy the spectral mask shown in FIG. 2.

Figure 1:
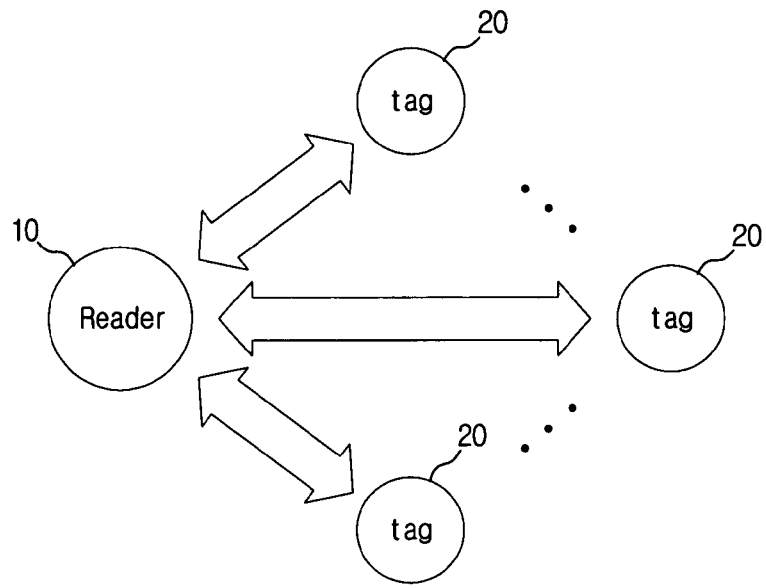

In conclusion, the intensity of the signal received at the sensing means 20 varies according to the distance between the sensing means 20 and the reader 10, the output power of the reader 10, the direction, and the modulation degree of the reader 10. Additionally, the pulse width detected after the envelope detection varies according to the signal intensity of the sensing means 20. Thus, the sensing means 20 cannot recognize the signal command received from the reader 10 because of the above-mentioned factors when the reader 10 is equipped with the channel filter. As a result, the reader 10 does not receive a reply signal from the intended sensing means 20.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above. According to an aspect of the present invention, there is provided a method of transmitting and receiving a signal over a wireless network using a pulse width list of a Tx signal to improve communication efficiency, and a reader.

A signal transmission and reception method of a reader which reads out information from at least one sensing means, includes creating a pulse width list relating to pulse widths when signals are transmitted; transmitting signals in sequence according to the created pulse width list; and receiving a reply signal with respect to the transmitted signals.

The pulse widths in the pulse width list may be set at a certain interval from a default value.

The certain interval may be an error allowable range of a critical signal pulse width.

The reader may be mobile.

The pulse widths in the pulse width list may correspond to a range from 10% to 90% of a baseband signal magnitude.

In accordance with another aspect of the present invention, a reader includes a list creator which creates a pulse width list relating to pulse widths when signals are transmitted; and a transceiver which transmits signals in sequence according to the created pulse width list and receives a reply signal with respect to the transmitted signals.

The list creator may set the pulse widths in the pulse width list at a certain interval from a default value.

The certain interval may be an error allowable range of a critical signal pulse width.

The list creator may recreate the pulse width list according to a movement of the location of the reader.

The pulse widths in the pulse width list may correspond to a range from 10% to 90% of a baseband signal magnitude.

In accordance with another aspect of the present invention, a wireless network includes a reader which creates a pulse width list relating to pulse widths when signals are transmitted and transmits the signals in sequence according to the created pulse width list; and a sensing means which transmits a reply signal to the reader after receiving a signal from the reader.

In accordance with another aspect of the present invention, a signal transmission and reception method of a reader which reads out information from at least one sensing means, includes creating a pulse width list relating to pulse widths when signals are transmitted; transmitting signals in sequence according to the created pulse width list; and creating an available pulse width list including a corresponding pulse width when a replay signal from the transmitted signals is received; and transmitting signals in sequence according to the created available pulse width list.

The signal transmission and reception method may further include receiving a reply signal with respect to the sequentially transmitted signals.

The pulse widths in the pulse width list may be set at a certain interval from a default value.

The certain interval may be an error allowable range of a critical signal pulse width.

The reader may be stationary.

In accordance with another aspect of the present invention, a reader includes a list creator which creates a pulse width list relating to pulse widths when signals are transmitted; and a transceiver which transmits signals in sequence according to the created pulse width list and receives a reply signal with respect to the transmitted signals, wherein the list creator creates an available pulse width list including a pulse width corresponding to the received reply signal, and the transceiver transmits signals in sequence according to the created available pulse width list.

The transceiver may receive a reply signal with respect to the sequentially transmitted signals.

The list creator may set the pulse widths in the pulse width list at a certain interval from a default value.

The certain interval may be an error allowable range of a critical signal pulse width.

The list creator may recreate the available pulse width list according to a location movement of the reader.

In accordance with another aspect of the present invention, a wireless network includes a reader which creates a pulse width list relating to pulse widths when signals are transmitted and transmits the signals in sequence according to the created pulse width list; and a sensing means which transmits a reply signal to the reader after receiving a signal from the reader, wherein the reader creates an available pulse width list including a pulse width corresponding to the received reply signal and transmits signals in sequence according to the created available pulse width list.

BRIEF DESCRIPTION OF THE DRAWING FIGURES

Figure 2:
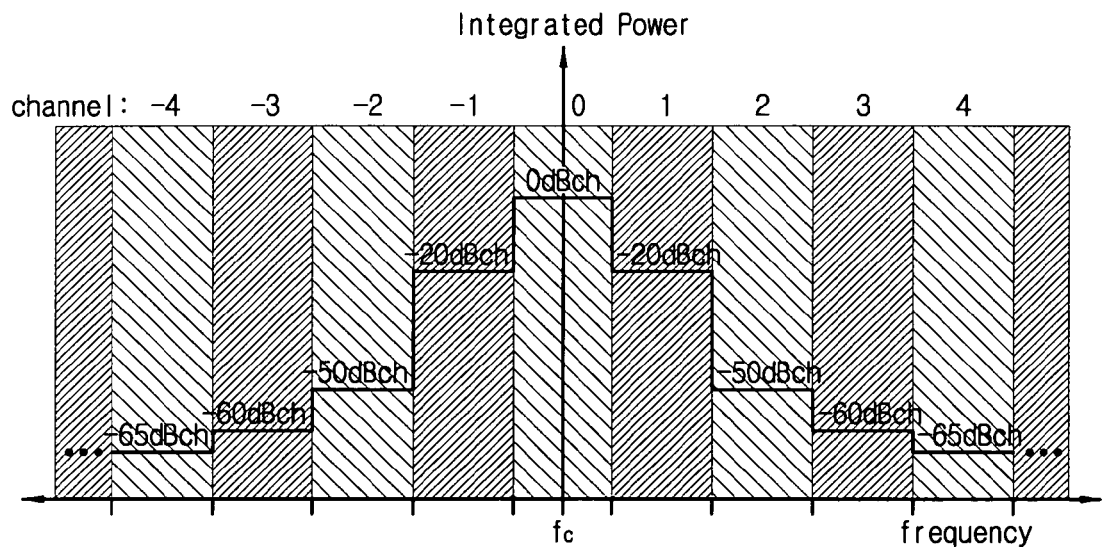
Figure 3A:
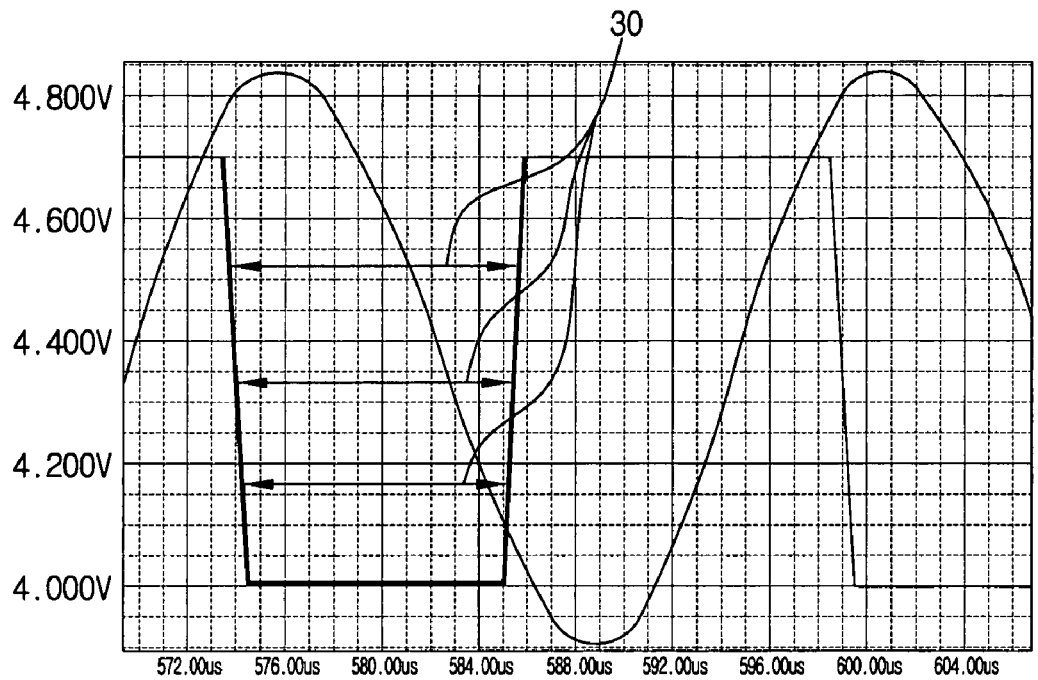
FIG. 3A is a graph showing a signal received at an envelope detector of the sensing means when the reader is not equipped with the channel filter. As one can see in FIG. 3A, the sensing means 20 has almost uniform pulse widths 30 during the envelope detection.
Figure 3B:
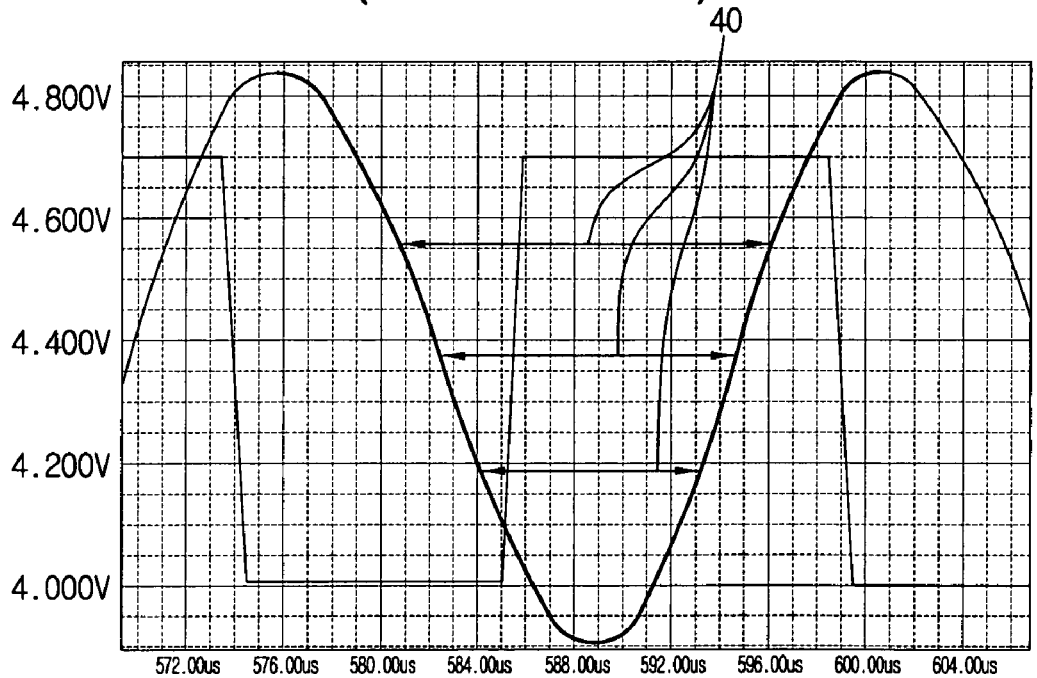
FIG. 3B is a graph showing a signal received at the envelope detector of the sensing means when the reader is equipped with the channel filter. As one can see in FIG. 3B, the sensing means 20 has variable pulse widths 40 in some cases during the envelope detection.
Figure 4:
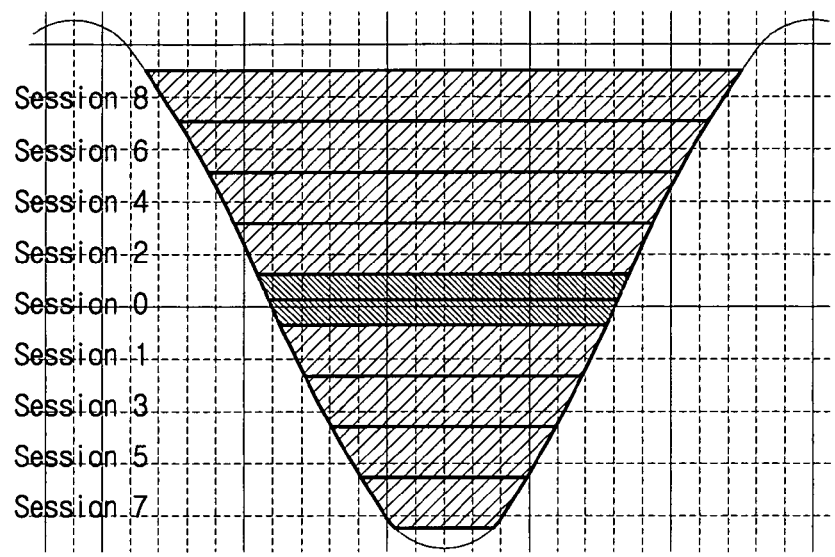
Figure 5:
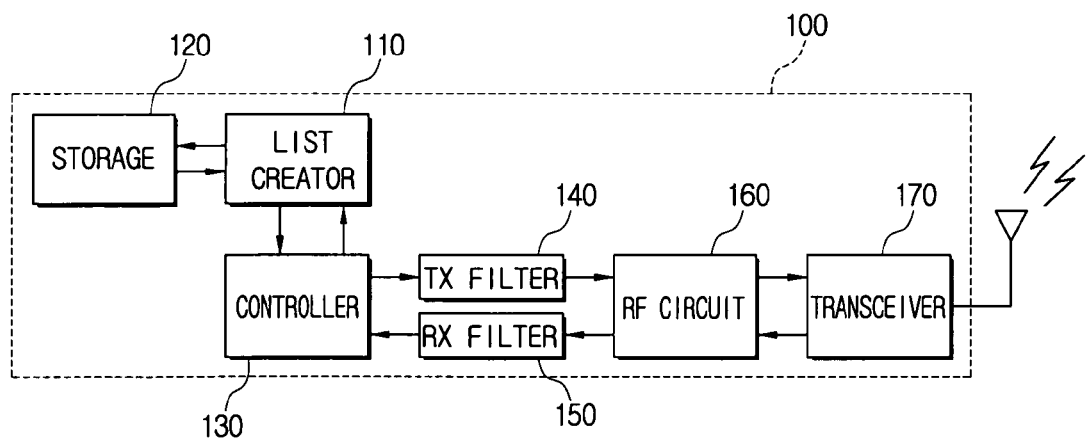
Figure 6:
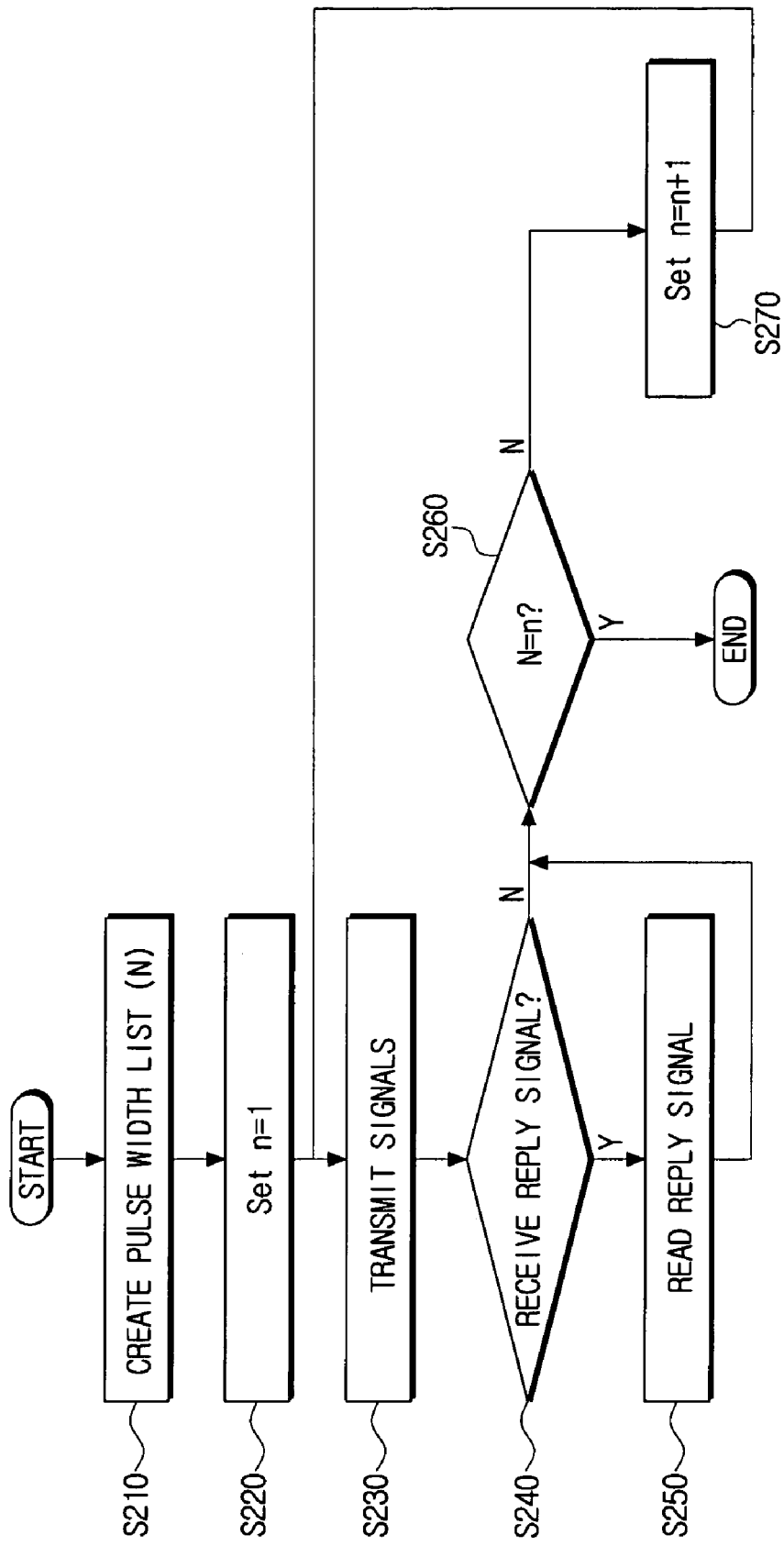
Figure 7:
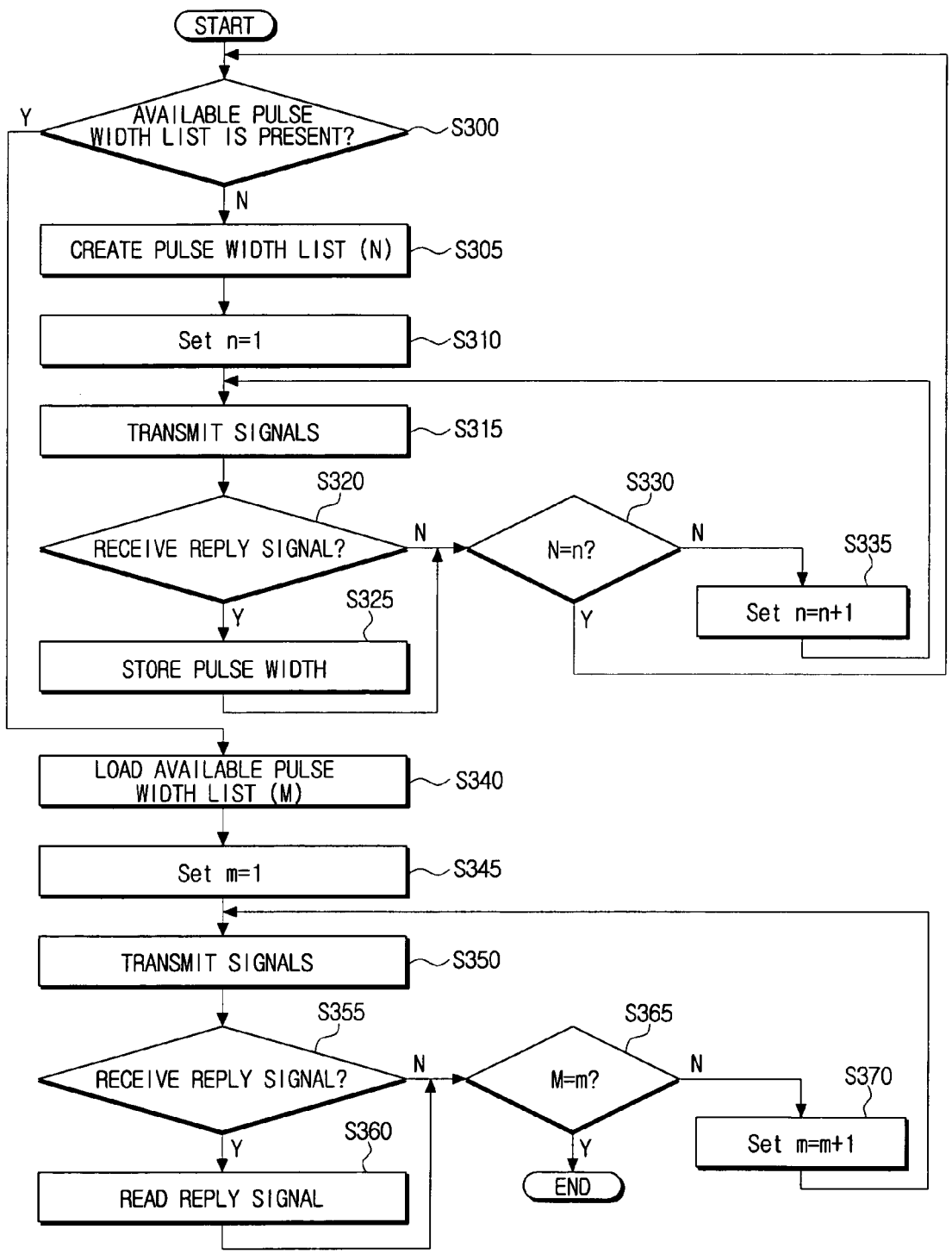

These and/or other aspects of the present invention will become more apparent and more readily appreciated from the following description of exemplary embodiments thereof, with reference to the accompanying drawings, in which:

FIG. 1 is a simplified diagram showing a wireless network system of the related art;

FIG. 2 is a graph showing a spectral mask in a wireless network environment where a plurality of readers is present;

FIG. 3A is a graph showing signals received at an envelope detector of the sensing means when the reader is not equipped with a channel filter;

FIG. 3B is a graph showing signals received at the envelope detector of the sensing means when the reader is equipped with a channel filter;

FIG. 4 is a diagram illustrating the principle of setting a pulse width at a reader according to an embodiment of the present invention;

FIG. 5 is a simplified block diagram of the reader in a network according to an embodiment of the present invention;

FIG. 6 is a flowchart outlining a method of transmitting and receiving a signal over the wireless network when the reader is mobile according to an embodiment of the present invention; and FIG. 7 is a flowchart outlining a method of transmitting and receiving a signal over the wireless network when the reader is stationary according to an embodiment of the present invention.

DETAILED DESCRIPTION OF THE EXEMPLARY EMBODIMENTS

Certain exemplary embodiments of the present invention will now be described in greater detail with reference to the accompanying drawings.

In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail, since they would obscure the invention in unnecessary detail.

To overcome the drawbacks of the related art, when a signal is transmitted by a reader, its pulse width is modified so that the pulse width of the signal command received by a sensing means can be recognized. Note that the reader transmits signals by setting the pulse widths stepwise because it is difficult for the sensing means to predict the pulse width of the received signal command.

FIG. 4 is a diagram illustrating the principle of setting a pulse width at a reader according to an embodiment of the present invention. Referring to FIG. 4, the reader classifies a Tx signal magnitude, ranging from 10% to 90%, on a step by step basis and sets a pulse width of the Tx signal corresponding to the stepwise interval.

Here, each stepwise interval is referred to as a session. The width of a session corresponds to the pulse width of the Tx signal for that session.

According to an embodiment of the present invention, the pulse width of each session is as set forth below:

*Pulse width of each session*
Session 0: PW=12.50 us (Default value)
Session 1: PW=11.25 us (Default value−1.25 us)
Session 2: PW=13.75 us (Default value+1.25 us)
Session 3: PW=10.00 us (Default value−2.50 us)
Session 4: PW=15.00 us (Default value+2.50 us) . . . .

The session classification can be based on an allowable error range of a critical signal pulse width.

The technical concept of the present invention may vary according to cases when the reader is mobile or stationary.

In the case of a mobile reader, the Tx signal, having pulse widths formed in sessions, is transmitted stepwise, and a reply signal is received from the sensing means which received the stepwise pulse width.

In the case of a stationary reader, the Tx signal having pulse widths formed in sessions, is transmitted stepwise, a reply signal is received from the sensing means which received the stepwise pulse width, and then a pulse width of the reply signal is stored. Afterwards, when transmitting a signal command to the sensing means, the reader takes account of only the stored pulse width and transmits a Tx signal having the stored pulse width.

FIG. 5 is a simplified block diagram of the reader in a network according to an embodiment of the present invention. Referring to FIG. 5, the reader 100 includes a list creator 110, a storage unit 120, a controller 130, a transmission (Tx)

filter 140, a receive (Rx) filter 150, a radio frequency (RF) circuit 160, and a transceiver 170.

The list creator 110 creates a pulse width list which is a list relating to pulse widths when transmitting a signal to the sensing means. When a reply signal is received from the sensing means, the list creator 110 creates an available pulse width list by setting a pulse width corresponding to the reply signal to an available pulse width.

The storage unit 120 stores the pulse width list and/or the available pulse width list created by the list creator 110. The controller 130 analyzes a signal input from outside and generates a signal command destined for the sensing means according to the analysis.

The Tx filter 140 filters the signal command generated by the controller 130 and provides the filtered signal command to the RF circuit 160. The Rx filter 150 filters a signal input from outside and provides the filtered signal to the controller 130.

The RF circuit 160 functions as a frequency mixer to transfer a signal command originating from the controller 130 to the transceiver 170. The transceiver 170 receives a signal from outside and forwards the received signal to the RF circuit 160, or transmits a signal command originating from the controller 130.

FIG. 6 is a flowchart outlining a method of transmitting and receiving a signal over a wireless network when the reader is mobile, according to an embodiment of the present invention.

Referring to FIGS. 5 and 6, the list creator 10 of the reader 100, at operation S210, creates the pulse width list for the signals to be transmitted on a step by step basis according to the communication environment.

The pulse width list created at operation S210 may set the pulse widths at a certain interval from a default value, and the certain interval may be an allowable error range of the critical signal pulse width. The number of pulse widths in the pulse width list is N and the created pulse width list is stored in the storage unit 120. In the embodiment of the present invention, session numbers ranging from 0 to N−1 may be assigned to each pulse width.

Next, the reader 100 sequentially transmits signals in order of the incremental session numbers from the pulse width corresponding to the default value. More particularly, when sending the signal with a pulse width corresponding to the default value, n=1 is set at operations S220 and S230.

The reader 100, at operation S240, checks whether a reply signal is received from the sensing means with respect to the signal having a pulse width corresponding to the default value. When the reply signal is received, the reader 100, at operation S250, reads out the reply signal and uses the received reply signal according to the purpose of the signal transmission.

After the reader 100 reads out the reply signal or if a reply signal is not received from the sensing means, the reader 100, at operation S260, checks whether N (the number of pulse widths in the pulse width list) equals n. If N equals n, the reader 100 aborts the signal transmission. If N is different from n, the reader 100 resets n to n+1 (n=n+1) at operation S270 and, at operation S230, sends the signal having a pulse width corresponding to the next session number. It is noted that operations S230 through S270 are repeated until the signals corresponding to all of the pulse widths in the pulse width list stored in storage unit 120 are transmitted.

FIG. 7 is a flowchart outlining the method of transmitting and receiving a signal over the wireless network when the reader is stationary according to an embodiment of the present invention.

Referring to FIGS. 5 and 7, when transmitting a signal to the sensing means, the reader 100, at operation S300, checks for the availability of a pulse width list that is indicative of a capability to receive a reply signal from the sensing means in the present installation environment.

If no such pulse width list is available, the reader 100 initiates the creation of an available pulse width list for the present environment. The list creator 110 of the reader 100, at operation S305, creates a pulse width list of signals to transmit step by step according to the communication environment.

At operation S305, the pulse width list may be created by setting the pulse widths at a certain interval from the default value, and the certain interval may be the allowable error range of the critical signal pulse width. At this time, the number of pulse widths in the pulse width list is N and the created pulse width list is stored in the storage unit 120. In an embodiment of the present invention, session numbers from 0 to N−1 may be assigned to the pulse widths.

Next, the reader 100 at operations S310 and S315 sequentially transmits signals in order of the session numbers starting from the pulse width corresponding to the default value. In more detail, a signal with a pulse width corresponding to the default width is transmitted by setting n=1.

The reader 100, at operation S320, checks whether a reply signal is received from the sensing means with respect to the transmitted signal with the pulse width corresponding to the default value. If the reply signal is received, the reader 100, at operation S325, stores the corresponding pulse width as an available pulse width in the storage unit 120. Note that the session number can be stored together with the pulse width. At operation S325, the reader 100 may read out and utilize the reply signal according to the purpose of the signal transmission.

After the reader 100 reads out the reply signal or if a reply signal is not received from the sensing means, the reader 100 checks whether N equals n at operation S330. If N equals n, the reader 100 aborts the signal transmission. If N is different from n, the reader 100 resets n to n+1 (n=n+1) at operation S335, and at operation S315 sends the signal having the pulse width corresponding to the next session number. It is noted that operations S315 through S335 are repeated until the signals corresponding to all of the pulse widths in the pulse width list stored in the storage unit 120 are transmitted.

As such, the reader 100 can acquire information relating to the pulse width based on the reply signal from the sensing means, that is, the pulse width for the signal received by the sensing means in the present communication environment, and store such a pulse width as the available pulse width list in the storage unit 120.

Afterwards, the reader 100 selectively transmits only signals corresponding to pulse widths in the available pulse width list stored in the storage unit 120 in the same communication environment, to thus improve the efficiency of the signal transmission.

Specifically, when the reader 100 has a signal to transmit to the sensing means and the available pulse width list is stored in the storage unit 120, the reader 100, at operation S340, prepares the signal transmission by loading the available pulse width list.

Provided that the number of available pulse widths in the available pulse width list stored in the storage unit 120 is M, the reader 100 transmits signals in sequence in the order of the session numbers starting from the smallest session number of the available pulse widths. In further detail, at operations S345 and S350 when transmitting a signal for the pulse width corresponding to the smallest session number, m is set to 1 (m=1).

The reader 100, at operation S355, checks whether a reply signal is received from the sensing means with respect to the signal for the available pulse width. If the reply signal is received, the reader 100, at operation S360, reads out and utilizes the reply signal according to the purpose of the signal transmission.

After the reader 100 reads out the reply signal or if a reply signal is not received from the sensing means, the reader 100 checks at operation S365 whether M equals m. If M equals m, the reader 100 aborts the signal transmission. If M is different from m, the reader 100 resets m to m+1 (m=m+1) at operation S370, and at operation S350 sends the signal having the pulse width corresponding to the next session number. It is noted that operations S350 through S370 are repeated until the signals corresponding to all of the available pulse widths in the available pulse width list stored in the storage 120 are transmitted.

As set forth above, by creating the pulse width list with the pulse widths of the Tx signal step by step and transmitting the Tx signals in sequence, the efficiency of the signal transmission and the reception in the network environment can be enhanced. Furthermore, as for the stationary reader in the communication environment, an available pulse width list storing the pulse width of the Tx signal having a reply signal is created and utilized to thus improve the efficiency of the signal transmission and the reception in the network environment.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A signal transmission and reception method of a reader which reads out information from at least one sensing means, the method comprising:
    creating a pulse width list including a plurality of pulse widths of transmission signals;
    transmitting a plurality of signals in sequence according to the created pulse width list, each of the plurality of signals having a different pulse width corresponding to one of the plurality of pulse widths in the created pulse width list; and
    receiving a reply signal with respect to the transmitted signals.

2. The signal transmission and reception method of claim 1, wherein the plurality of pulse widths in the pulse width list are set at a certain interval from a default value.

3. The signal transmission and reception method of claim 2, wherein the certain interval is an allowable error range of a critical signal pulse width.

4. The signal transmission and reception method of claim 1, wherein the reader is mobile.

5. The signal transmission and reception method of claim 1, wherein the plurality of pulse widths in the pulse width list range from 10% to 90% of a baseband signal magnitude.

6. A reader comprising:
    a list creator configured to create a pulse width list including a plurality of pulse widths of transmission signals; and
    a transceiver configured to transmit a plurality of signals in sequence according to the created pulse width list, each of the plurality of signals having a different pulse width corresponding to one of the plurality of pulse widths in the created pulse width list, and to receive reply signals with respect to the transmitted signals.

7. The reader of claim 6, wherein the list creator is configured to set the plurality of pulse widths in the pulse width list at a certain interval from a default value.

8. The reader of claim 7, wherein the certain interval is an allowable error range of a critical signal pulse width.

9. The reader of claim 6, wherein the reader is mobile and the list creator is configured to recreate the pulse width list according to a change in location of the reader.

10. The reader of claim 6, wherein the plurality of pulse widths in the pulse width list range from 10% to 90% of a baseband signal magnitude.

11. The reader of claim 6, further comprising a channel filter which filters the signals before the signals are transmitted by the transceiver.

12. The reader of claim 6, wherein the created pulse width list includes a one-time listing of each of the plurality of pulse widths, and the sequence according to the created pulse width list follows an order of the one-time listing of the plurality of pulse widths, and the plurality of signals are transmitted once, one after another, in the sequence corresponding to the order of the one-time listing until each of the plurality of signals are transmitted.

13. A wireless network comprising:
    a reader configured to create a pulse width list including a plurality of pulse widths of signals to transmit and to transmit a plurality of signals in sequence according to the created pulse width list, each of the plurality of signals having a different pulse width corresponding to one of the plurality of pulse widths in the created pulse width list; and
    a sensing means configured to transmit reply signals to the reader in response to receiving at least one transmitted signal from the reader.

14. The wireless network of claim 13, wherein the reader includes a channel filter which filters the signals before the signals are transmitted.

15. A signal transmission and reception method of a reader which reads out information from at least one sensing means, the method comprising:
    creating a pulse width list including a plurality of pulse widths of signals to transmit;
    transmitting a first plurality of signals in sequence according to the created pulse width list, each of the first plurality of signals having a different pulse width corresponding to one of the plurality of pulse widths in the created pulse width list;
    creating an available pulse width list including corresponding pulse widths in response to receiving reply signals in reply to receiving the transmitted first plurality of signals; and
    transmitting a second plurality of signals in sequence according to the created available pulse width list.

16. The signal transmission and reception method of claim 15, further comprising:
    receiving further reply signals in response to transmitting the second plurality of signals.

17. The signal transmission and reception method of claim 15, wherein the plurality of pulse widths in the pulse width list are set at a certain interval from a default value.

18. The signal transmission and reception method of claim 17, wherein the certain interval is an allowable error range of a critical signal pulse width.

19. The signal transmission and reception method of claim 15, wherein the reader is stationary.

20. The signal transmission and reception method of claim 15, wherein the reader is mobile and the creating the available pulse width list includes recreating the available pulse width list according to a change in location of the reader.

21. The signal transmission and reception method of claim 15, wherein the first plurality of signals and the second plurality of signals are filtered through a channel filter before the transmitting thereof.

22. A reader comprising:
a list creator configured to create a pulse width list including a plurality of pulse widths of transmission signals; and
a transceiver configured to transmit a plurality of signals in sequence according to the created pulse width list, each of the plurality of signals having a different pulse width corresponding to one of the plurality of pulse widths in the created pulse width list, and to receive reply signals received in response to the transmitted plurality of signals,
wherein the list creator is configured to create an available pulse width list including pulse widths corresponding to the received reply signals, and
the transceiver is configured to transmit signals in sequence according to the created available pulse width list.

23. The reader of claim 22, wherein the transceiver is configured to receive further reply signals with respect to the signals sequentially transmitted according to the available pulse width list.

24. The reader of claim 22, wherein the list creator is configured to set the plurality of pulse widths in the pulse width list at a certain interval from a default value.

25. The reader of claim 24, wherein the certain interval is an allowable error range of a critical signal pulse width.

26. The reader of claim 22, wherein the reader is mobile and the list creator recreates the available pulse width list according to a change in location of the reader.

27. The reader of claim 22, further comprising a channel filter which filters the plurality of signals corresponding to the created pulse width list and the signals corresponding to the created available pulse width list before each signal is transmitted by the transceiver.

28. The reader of claim 22, wherein, if a reply signal is received by the transceiver in response to one of the plurality of signals, the list creator adds the pulse width corresponding to the one of the plurality of signals to the available pulse width list such that the available pulse width list is indicative of a capability of the transceiver to receive the reply signals in a present installation environment.

29. The reader of claim 28, wherein, after the list creator creates the available pulse width list, the transceiver selectively transmits only signals of the plurality of signals corresponding to the pulse widths added to the available pulse width list.

30. A wireless network comprising:
a reader configured to create a pulse width list including a plurality of pulse widths of transmission signals and to transmit a plurality of transmission signals in sequence according to the created pulse width list, each of the plurality of transmission signals having a different pulse width corresponding to one of the plurality of pulse widths in the created pulse width list; and
a sensing device configured to transmit a reply signal to the reader in response to receiving one of the transmission signals transmitted from the reader,
wherein the reader is configured to create an available pulse width list including a pulse width corresponding to the received reply signal and to transmit signals in sequence according to the created available pulse width list.

31. The signal transmission and reception method of claim 1, further comprising filtering the signals through a channel filter before the transmitting the signals.

32. The wireless network of claim 30, wherein the reader includes a channel filter which filters the plurality of transmission signals corresponding to the created pulse width list and the signals corresponding to the created available pulse width list before each signal is transmitted.

* * * * *